(12) United States Patent
Ueda et al.

(10) Patent No.: US 10,826,263 B2
(45) Date of Patent: Nov. 3, 2020

(54) LASER MEDIUM UNIT AND LASER DEVICE

(71) Applicant: HAMAMATSU PHOTONICS K.K., Hamamatsu-shi, Shizuoka (JP)

(72) Inventors: Kenichi Ueda, Hamamatsu (JP); Koichi Iyama, Osaka (JP); Yoshinori Kato, Hamamatsu (JP); Takashi Sekine, Hamamatsu (JP); Toshiyuki Kawashima, Hamamatsu (JP)

(73) Assignee: Hamamatsu Photonics K.K., Hamamatsu (JP)

( * ) Notice: Subject to any disclaimer, the term of this patent is extended or adjusted under 35 U.S.C. 154(b) by 0 days.

(21) Appl. No.: 16/484,302

(22) PCT Filed: Feb. 5, 2018

(86) PCT No.: PCT/JP2018/003838
§ 371 (c)(1),
(2) Date: Aug. 7, 2019

(87) PCT Pub. No.: WO2018/147231
PCT Pub. Date: Aug. 16, 2018

(65) Prior Publication Data
US 2019/0356105 A1  Nov. 21, 2019

(30) Foreign Application Priority Data
Feb. 8, 2017 (JP) ............... 2017-021361

(51) Int. Cl.
*H01S 3/04* (2006.01)
*H01S 3/042* (2006.01)
(Continued)

(52) U.S. Cl.
CPC ............... *H01S 3/042* (2013.01); *H01S 3/04* (2013.01); *H01S 3/0405* (2013.01);
(Continued)

(58) Field of Classification Search
CPC ........ H01S 3/042; H01S 3/06; H01S 3/08072; H01S 3/04; H01S 3/0407; H01S 3/0405;
(Continued)

(56) References Cited

U.S. PATENT DOCUMENTS 5,504,764 A  4/1996 Pohlmann et al.
5,553,088 A  9/1996 Brauch et al.
(Continued)

FOREIGN PATENT DOCUMENTS

JP  H05-226732 A  9/1993
JP  H08-8477 A  1/1996
(Continued)

OTHER PUBLICATIONS

International Preliminary Report on Patentability dated Aug. 22, 2019 for PCT/JP2018/003838.

*Primary Examiner* — Kinam Park
(74) *Attorney, Agent, or Firm* — Faegre Drinker Biddle & Reath LLP

(57) ABSTRACT

A laser medium unit includes: a plate-shaped laser gain medium which includes a first surface and a second surface opposite to the first surface and generates emission light by the irradiation of excitation light from the first surface; a reflection member that is provided on the second surface so as to reflect the excitation light and the emission light; and a cooling member that cools the laser gain medium. The laser gain medium includes an irradiation area which is irradiated with the excitation light and an outer area which is located outside the irradiation area when viewed from a thickness direction intersecting the first surface and the second surface. The cooling member is thermally connected to the second surface through the reflection member so that a cooling area of the laser gain medium is formed on the second surface.

5 Claims, 12 Drawing Sheets

(51) Int. Cl.
*H01S 3/06* (2006.01)
*H01S 3/08* (2006.01)
*H01S 3/16* (2006.01)

(52) U.S. Cl.
CPC ............ *H01S 3/0407* (2013.01); *H01S 3/06* (2013.01); *H01S 3/061* (2013.01); *H01S 3/0604* (2013.01); *H01S 3/0606* (2013.01); *H01S 3/08072* (2013.01); *H01S 3/16* (2013.01); *H01S 3/1611* (2013.01); *H01S 3/1641* (2013.01); *H01S 3/1643* (2013.01)

(58) Field of Classification Search
CPC ...... H01S 3/0604; H01S 3/0606; H01S 3/061; H01S 3/16; H01S 3/1611; H01S 3/1643; H01S 3/1641
See application file for complete search history.

(56) References Cited

U.S. PATENT DOCUMENTS

| | | | |
|---|---|---|---|
| 7,535,633 B2 * | 5/2009 | Franjic | H01S 3/042 359/344 |
| 2005/0090030 A1 * | 4/2005 | Sridharan | H01S 3/0606 438/33 |
| 2017/0117681 A1 * | 4/2017 | Kopf | H01S 3/1611 |

FOREIGN PATENT DOCUMENTS

| | | |
|---|---|---|
| JP | 2006-196882 A | 7/2006 |
| JP | 2006-237170 A | 9/2006 |
| JP | 2014-22568 A | 2/2014 |
| JP | 2015-167216 A | 9/2015 |
| WO | WO-2015/135011 A1 | 9/2015 |

\* cited by examiner

*Fig.4*
(a)
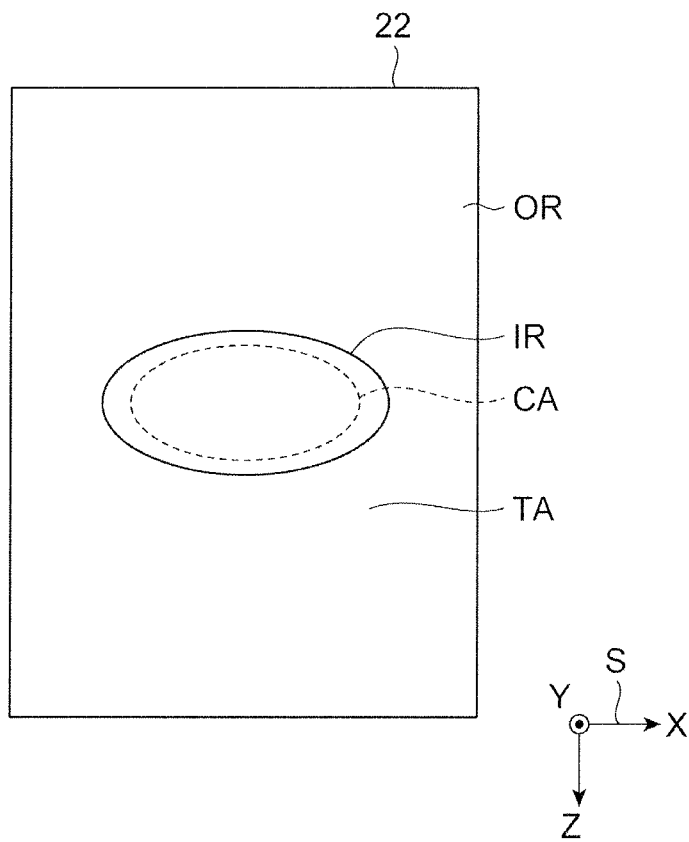
(b)
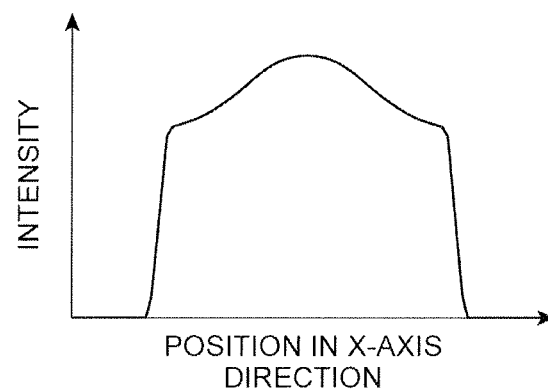

Fig.5
(a) 
(b) 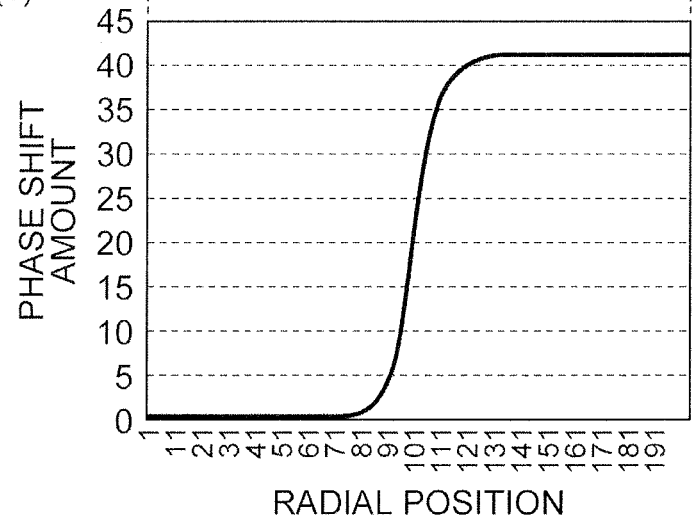
(c) 
(d) 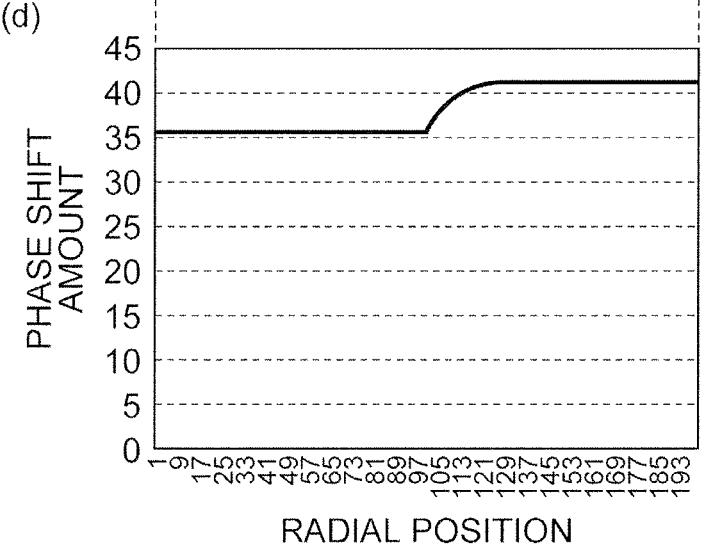

*Fig.6*
(a)
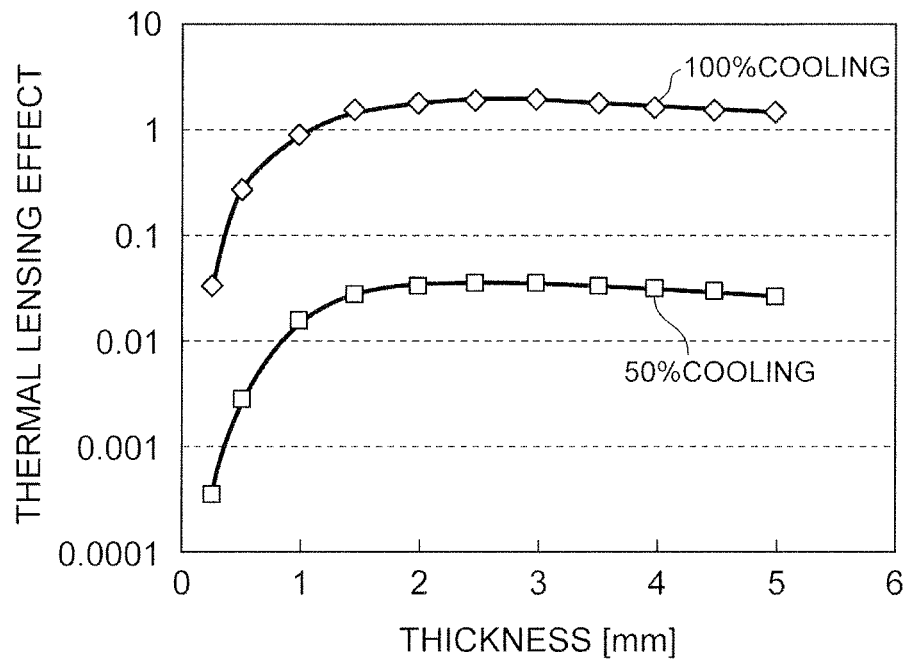
(b)
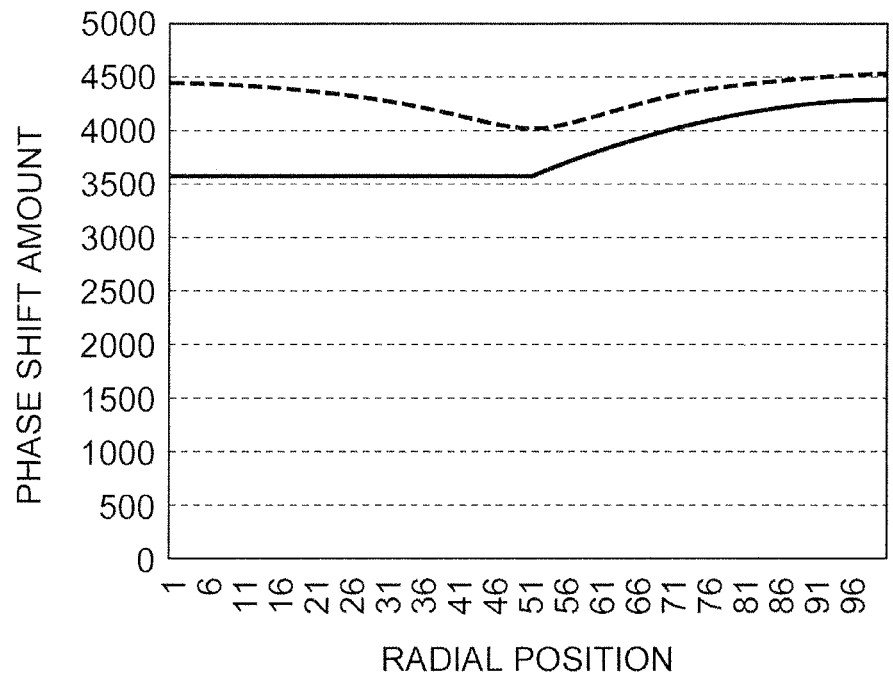

Fig.8
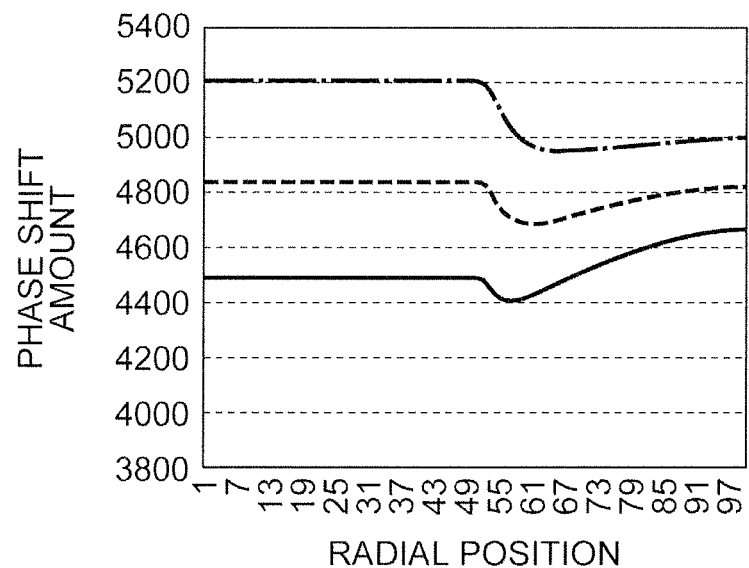
(a)
(b)
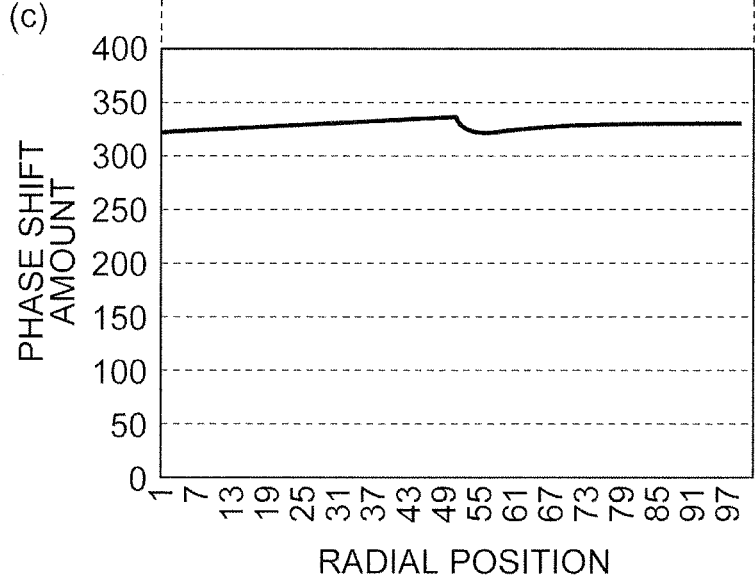
(c)

LASER MEDIUM UNIT AND LASER DEVICE

TECHNICAL FIELD

An aspect of the present invention relates to a laser medium unit and a laser device.

BACKGROUND ART

Patent Literature 1 describes a laser medium unit. This laser medium unit includes a laser medium in which a plurality of plate-shaped laser gain media generating emission light by the irradiation of excitation light are bonded to an optical medium allowing both of the excitation light and the emission light to be transmitted therethrough. Further, this laser medium unit includes a container which accommodates the laser medium and has a cooling medium passage for cooling the laser gain medium.

CITATION LIST

Patent Literature

Patent Literature 1: Japanese Patent Application No. 2015-167216

SUMMARY OF INVENTION

Technical Problem

In the laser medium unit described in Patent Literature 1, the laser gain medium has a rectangular plate shape as an example. Then, in the laser gain medium, one surface of a pair of surfaces intersecting each other in the thickness direction is bonded to the optical medium so as to be used as an input/output surface of the excitation light and the emission light and the entirety of the other surface is in contact with the cooling medium passage so as to be used for a cooling operation. Particularly, in this laser medium unit, a cross-sectional area of the cooling medium passage is adjusted to control a flow rate of a cooling medium inside the cooling medium passage so that the temperature uniformity of the laser gain medium is improved. That is, in the above-described technical field, it is preferable to reduce a thermal lensing effect due to a temperature gradient in order to improve beam quality.

Here, an aspect of the invention is to provide a laser medium unit and a laser device capable of improving beam quality.

Solution to Problem

In order to solve the above-described problems, the inventor has conducted a careful examination and found knowledge that a thermal lensing effect can be reduced by controlling a relative relationship between an irradiation area of excitation light in a laser gain medium and a cooling area provided to cool the laser gain medium. That is, the inventor has found that a thermal lensing effect can be reduced as compared with a case in which a range wider than the irradiation area is cooled by setting the cooling area to be equal to or smaller than the irradiation area of the excitation light. An aspect of the invention is obtained on the basis of the knowledge.

That is, a laser medium unit according to an aspect of the invention includes: a plate-shaped laser gain medium which includes a first surface and a second surface opposite to the first surface and generates emission light by the irradiation of excitation light from the first surface; a reflection member that is provided on the second surface so as to reflect the excitation light and the emission light; and a cooling member that cools the laser gain medium, in which the laser gain medium includes an irradiation area which is irradiated with the excitation light and an outer area which is located outside the irradiation area when viewed from a thickness direction intersecting the first surface and the second surface, in which the cooling member is thermally connected to the second surface through the reflection member so that a cooling area of the laser gain medium is formed on the second surface, and in which an outer edge of the cooling area is located inside the irradiation area when viewed from the thickness direction.

In this laser medium unit, the plate-shaped laser gain medium includes the first surface which is the incident surface of the excitation light and the second surface which is the surface opposite to the first surface and is provided with the cooling area of the cooling member. Further, the laser gain medium includes the irradiation area which is irradiated with the excitation light and the outer area which is located on the outside of the irradiation area when viewed from the thickness direction. Then, the outer edge of the cooling area is located inside the irradiation area of the excitation light when viewed from the thickness direction. That is, in this laser medium unit, the cooling area is set to be equal to or smaller than the irradiation area of the excitation light when viewed from the thickness direction of the laser gain medium. Thus, according to this laser medium unit, it is possible to reduce the thermal lensing effect and to improve the beam quality. Additionally, the cooling area indicates, for example, an area in which the cooling member and the second surface are in contact through the reflection member.

The laser medium unit according to an aspect of the invention may further include a heating member that heats the laser gain medium and the heating member may be provided on a surface other than the first surface in an outer edge portion of the laser gain medium and heats the laser gain medium by inputting heat to the outer area. By using such a heating member, it is possible to further reduce the thermal lensing effect without disturbing the incidence of the excitation light on the first surface.

In the laser medium unit according to an aspect of the invention, the laser gain medium may include a third surface which is located on the side of the outer edge portion and connects the first surface and the second surface in the thickness direction and the heating member may be provided on the third surface. In this way, the heating member can be provided on the third surface which is the side end surface of the laser gain medium.

A laser device according to an aspect of the invention includes the above-described laser medium unit and an input optical system which inputs the excitation light and the laser light to be amplified from the first surface to the laser gain medium. This laser device includes the above-described laser medium unit. Thus, according to this laser device, it is possible to reduce the thermal lensing effect of the laser gain medium and to improve the beam quality.

The laser device according to an aspect of the invention may further include an optical medium to which an active element is not added and through which the excitation light and the laser light are transmittable, the laser gain medium may be provided on the optical medium so that the first surface is bonded to the optical medium, and the input optical system may input the laser light and the excitation light from the first surface to the laser gain medium through the optical medium by the coaxial optical path.

Advantageous Effects of Invention

According to an aspect of the invention, it is possible to provide a laser medium unit and a laser device capable of improving beam quality.

BRIEF DESCRIPTION OF DRAWINGS

FIG. 4 is a diagram illustrating a laser gain medium and an excitation light intensity distribution illustrated in FIG. 1.

FIG. 5 is a diagram showing a result obtained by calculating a phase shift amount of the laser gain medium.

FIG. 6 is a graph showing a calculation result of a relationship between the laser gain medium and a thermal lensing effect and is a graph showing a calculation result of a change of a phase shift amount depending on the heating of the laser gain medium by a heating member.

FIG. 8 is a diagram showing a calculation result for optimizing the cooling area.

DESCRIPTION OF EMBODIMENTS

Figure 1:
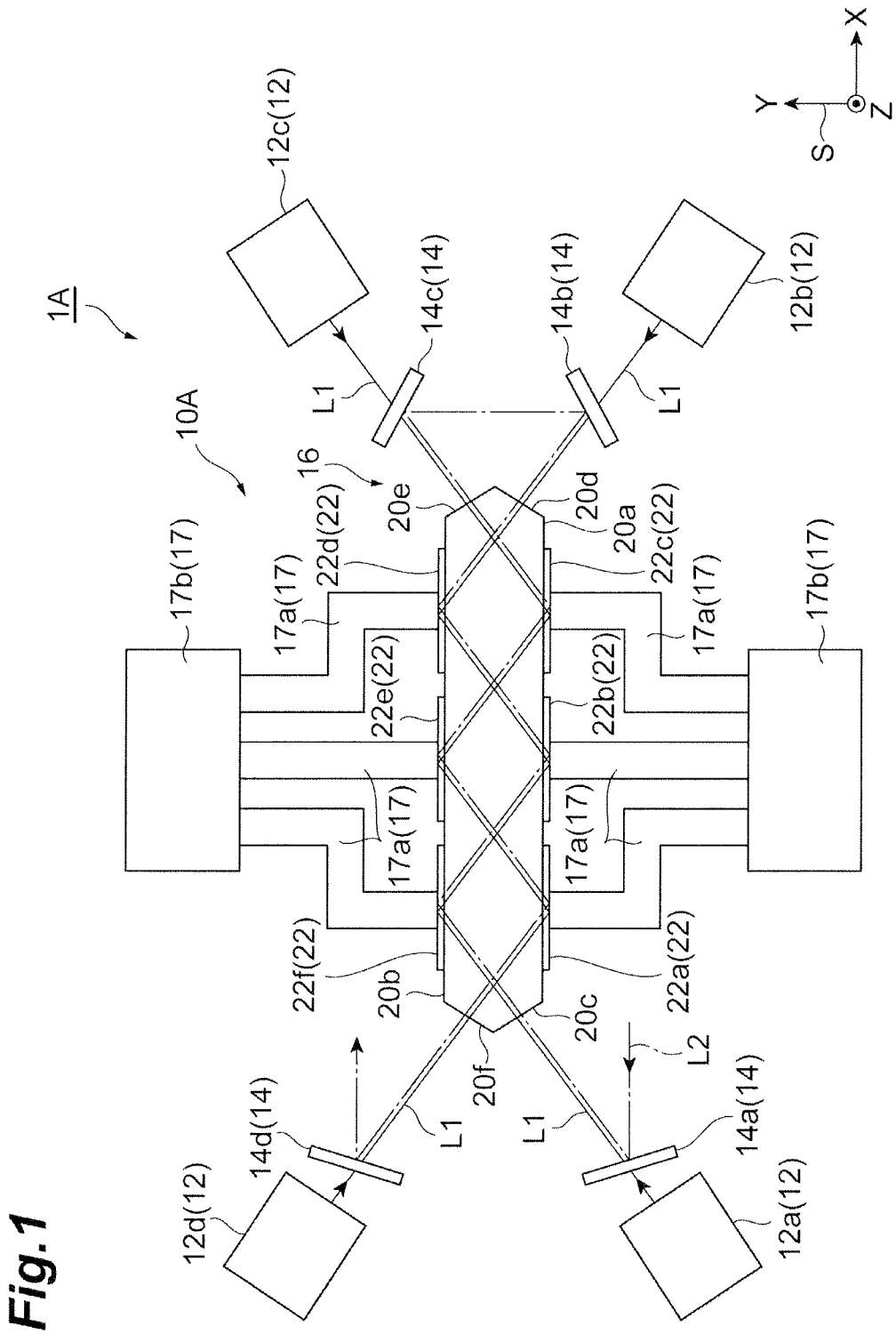
FIG. 1 is a diagram illustrating an outline of a laser device according to a first embodiment.

Hereinafter, embodiments according to an aspect of the invention will be described in detail with reference to the drawings. Additionally, in the drawings, the same or equivalent components will be denoted by the same reference numerals and a redundant description thereof will be omitted. Further, in the drawings, there is a case where an orthogonal coordinate system S defined by X, Y, and Z axes is illustrated.

First Embodiment

Figure 2:
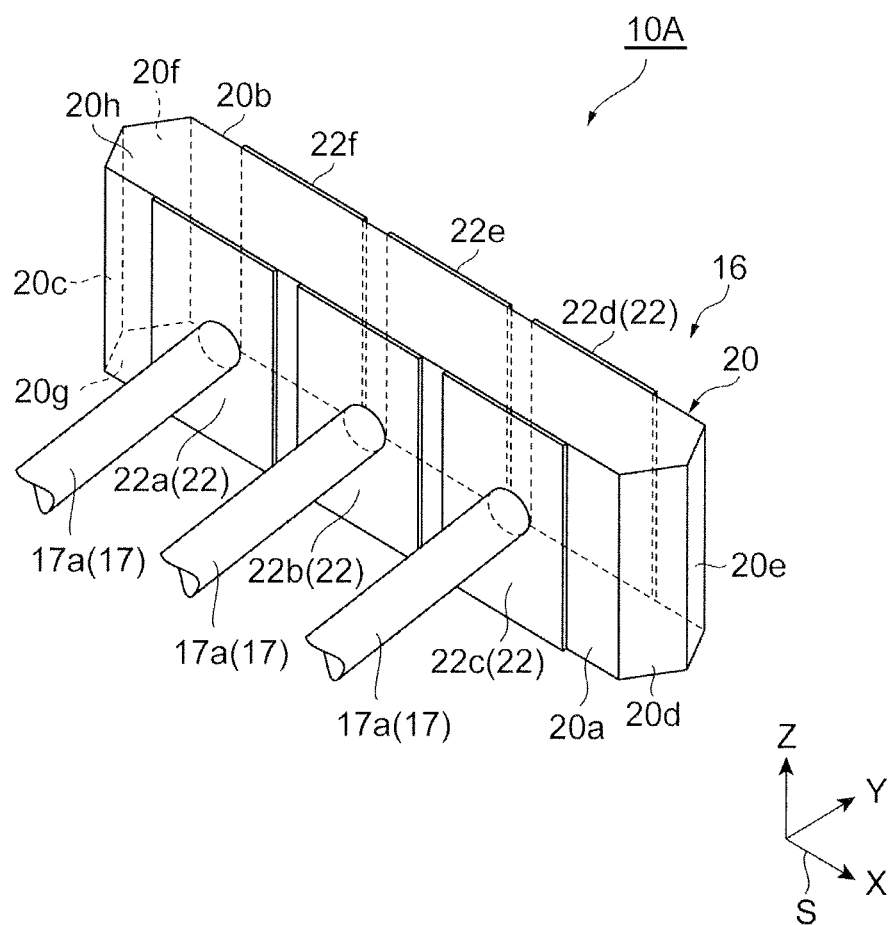
FIG. 2 is a perspective view illustrating a laser medium illustrated in FIG. 1.
Figure 3:
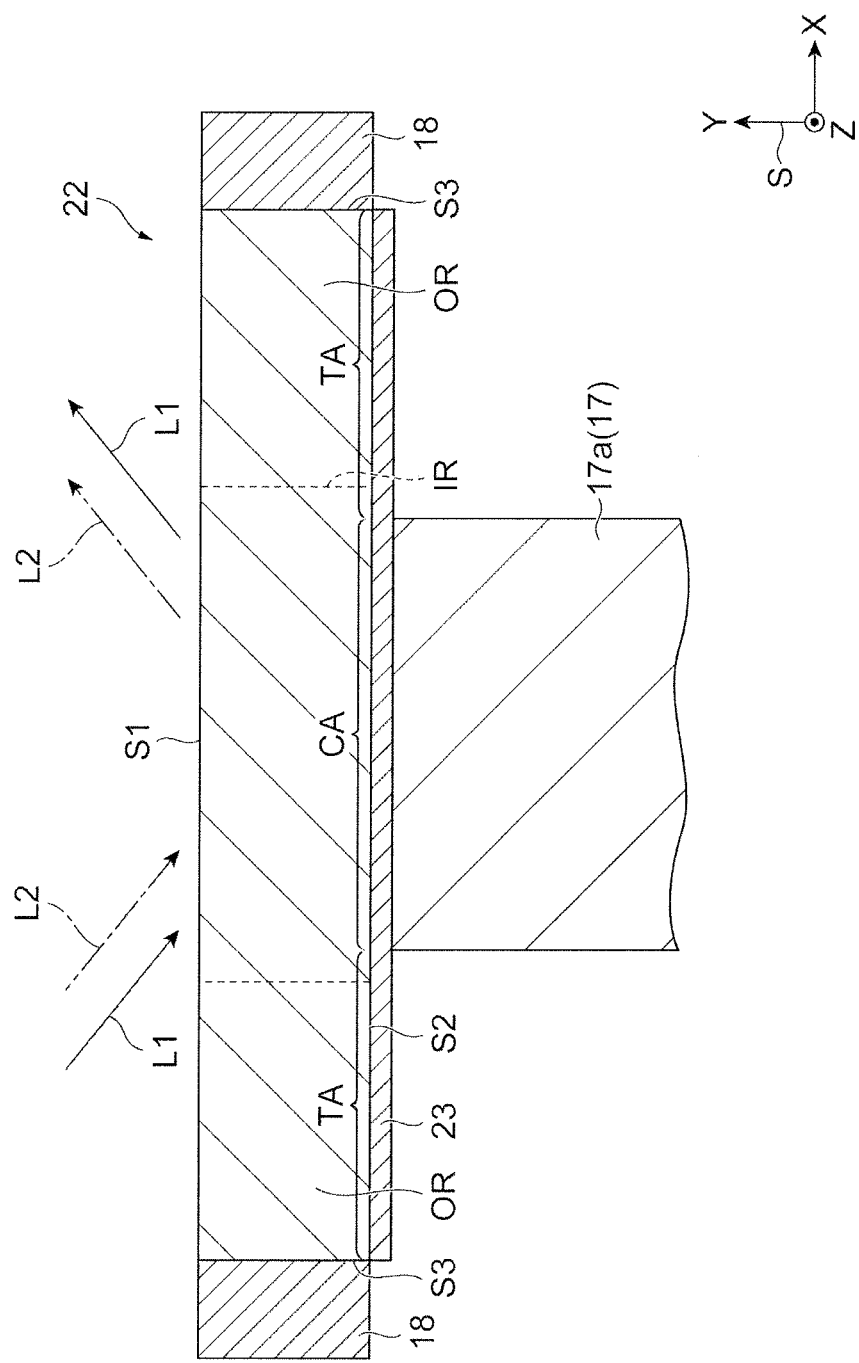
FIG. 3 is a partially enlarged cross-sectional view of the laser device illustrated in FIG. 1.

FIG. 1 is a diagram illustrating an outline of a laser device according to a first embodiment. FIG. 2 is a perspective view illustrating a laser medium illustrated in FIG. 1. FIG. 3 is a partially enlarged cross-sectional view of the laser device illustrated in FIG. 1. As illustrated in FIGS. 1 to 3, a laser device 1A includes a laser medium unit 10A, a plurality of (here, four) excitation light source units 12 (excitation light source units 12a, 12b, 12c, and 12d) which supply excitation light L1, and a plurality of (here, four) mirror portions 14 (mirror portions 14a, 14b, 14c, and 14d) which reflect laser light L2 corresponding to light (seed light) to be amplified.

The laser medium unit 10A includes a slab laser medium 16, a container (not illustrated) which accommodates the laser medium 16, a cooling member 17, and a plurality of heating members 18. Here, the heating member 18 is not illustrated in FIGS. 1 and 2. The laser medium 16 includes an optical medium 20, a plurality of (here, six) plate-shaped laser gain media 22 (laser gain media 22a, 22b, 22c, 22d, 22e, and 22f), and a plurality of reflection members 23 (see FIG. 3). The laser gain media 22 are respectively bonded to the optical media 20.

Here, the optical medium 20 is a thin flat plate having a hexagonal column shape and includes six flat side surfaces 20a, 20b, 20c, 20d, 20e, and 20f. As an example, the dimensions of the optical medium 20 in the X-axis direction, the Y-axis direction, and the Z-axis direction are about 100 mm, 15 mm, and 30 mm. The side surfaces 20a and 20b have the same shape and the side surfaces 20c to 20f have the same shape. The side surface 20b is parallel to the side surface 20a and is located on the side opposite to the side surface 20a and the side surface 20e is parallel to the side surface 20c and is located on the side opposite to the side surface 20c. Similarly, the side surface 20f is parallel to the side surface 20d and is located on the side opposite to the side surface 20d.

The side surfaces 20c and 20f which intersect each other respectively intersect the side surfaces 20a and 20b. Similarly, the side surfaces 20d and 20e which intersect each other respectively intersect the side surfaces 20a and 20b. The optical medium 20 can be symmetric with respect to an imaginary plane which is parallel to the side surface 20a (or the side surface 20b) and is located at the center between the side surface 20a and the side surface 20b in the normal direction of the side surface 20a.

The optical medium 20 is, for example, a transparent member formed of yttrium-aluminum garnet (YAG). For example, an active element such as Nd is not added to the optical medium 20. The excitation light L1 and the laser light L2 can be transmitted through the optical medium 20.

The laser gain media 22 have the same shape. Thus, FIG. 3 representatively illustrates a portion corresponding to one laser gain medium 22. As an example, the laser gain medium 22 has a rectangular plate shape. Here, the Y-axis direction is set as the thickness direction of the laser gain medium 22 and the X-axis direction and the Z-axis direction are set as the extension direction of the laser gain medium 22 (a direction along the plate surface). The dimension of the laser gain medium 22 in the extension direction is larger than an irradiation area (an irradiation area IR to be described later) of the incident excitation light L1.

The laser gain medium 22 is, for example, YAG doped with Nd as an active element. That is, an active element is added to the laser gain medium. The laser gain medium 22 is excited by the excitation light L1 so as to output emission light. An example of the emission light is stimulated emission light. This stimulated emission light contributes to the light amplification of the laser light L2. The laser gain media 22a to 22c are bonded to the side surface 20a of the optical medium 20 and the laser gain media 22d to 22f are bonded to the side surface 20b. The laser gain medium 22 can be bonded to the optical medium 20 by, for example, a ceramic composite technique.

The side surfaces 20c, 20d, 20e, and 20f to which the laser gain medium 22 is not bonded among the side surfaces 20a to 20f of the optical medium 20 are input/output surfaces where at least one of the excitation light L1 and the laser light L2 is incident and emitted. The excitation light source units 12 respectively output the excitation light L1 incident from the side surfaces 20c, 20d, 20e, and 20f. The excitation light source unit 12 includes an excitation light source such as a semiconductor laser (for example, a laser diode) outputting light of a wavelength capable of exciting the laser gain medium 22. The excitation light source unit 12 may include a condensing optical system that condenses the excitation light L1 output from the excitation light source.

The mirror portions 14 are disposed on the optical path of the excitation light L1 from the excitation light source units 12 so as to be located between the side surfaces 20c to 20f and the excitation light source units 12 corresponding to the side surfaces 20c to 20f. The mirror portion 14 allows the excitation light L1 to be transmitted therethrough and allows the laser light L2 to be fully reflected therefrom. In particular, the mirror portion 14a reflects the laser light L2 and allows the laser light L2 to be incident from the side surface 20c to the optical medium 20. The laser light L2 can be, for example, light output from a laser light source such as a fiber laser. The laser light L2 is incident from a direction different from the axial direction of the optical path of the excitation light L1 from the excitation light source unit 12a into the mirror portion 14a.

The mirror portion 14a is disposed to reflect the laser light L2 so that the laser light L2 is propagated through the optical medium 20 by the optical path coaxial with the optical path of the excitation light L1 output from the excitation light source unit 12a. In FIG. 1, the laser light L2 reflected by the mirror portion 14a is parallel to the excitation light L1, but this is a convenience for specifying the laser light L2. Similarly, in FIG. 1, the parallel arrangement of the excitation light L1 and the laser light L2 indicates a coaxial state thereof.

The mirror portions 14b and 14c are disposed so that the laser light L2 emitted from the side surface 20d of the optical medium 20 is incident to the optical medium 20 again in a direction coaxial with the optical path of the excitation light L1 from the excitation light source unit 12c. The mirror portion 14d is disposed to reflect the laser light L2 emitted from the side surface 20f in a direction different from the axial direction of the optical path of the excitation light L1 from the excitation light source unit 12d.

The excitation light L1 output from the excitation light source unit 12 is transmitted through the mirror portion 14 and is incident from the corresponding side surfaces 20c to 20f to the optical medium 20. As will be described later, the excitation light L1 which is incident to the optical medium 20 is reflected by the reflection member 23 in a second surface S2 of the laser gain medium 22 so that the excitation light is propagated through the optical medium 20 in a zigzag shape and is emitted from the side surfaces 20c to 20f.

Specifically, the excitation light L1 which is incident from the side surface 20c passes through the laser gain media 22f, 22b, and 22d in order of the laser gain medium 22f, the laser gain medium 22b, and the laser gain medium 22d so as to be emitted from the side surface 20d. In contrast, the excitation light L1 which is incident from the side surface 20d passes through the laser gain media 22d, 22b, and 22f in order of the laser gain medium 22d, the laser gain medium 22b, and the laser gain medium 22f so as to be emitted from the side surface 20c. The paths of the excitation lights L1 respectively input from the side surfaces 20c and 20d can be set to opposite directions.

The excitation light L1 which is incident from the side surface 20e passes through the laser gain media 22c, 22e, and 22a in order of the laser gain medium 22c, the laser gain medium 22e, and the laser gain medium 22a so as to be emitted from the side surface 20f. In contrast, the excitation light L1 which is incident from the side surface 20f passes through the laser gain media 22a, 22e, and 22c in order of the laser gain medium 22a, the laser gain medium 22e, and the laser gain medium 22c so as to be emitted from the side surface 20e. The paths of the excitation lights L1 respectively input from the side surfaces 20e and 20f can be set to opposite directions.

A part of the excitation light L1 excites the laser gain medium 22 while being absorbed to the laser gain medium 22 during the propagation inside the optical medium 20. As the incidence of the excitation light L1 from the excitation light source unit 12 to the side surfaces 20c to 20f, a perpendicular incidence can be exemplified. However, the excitation light L1 may be obliquely incident from the excitation light source unit 12 to the side surfaces 20c to 20f.

When the excitation light L1 is obliquely incident from the excitation light source unit 12 to the corresponding side surfaces 20c to 20f, the incidence angle of the excitation light L1 with respect to the side surfaces 20c to 20f can be set to a degree that the axis of the optical path of the excitation light L1 propagated in the opposite direction slightly deviates inside the optical medium 20. Accordingly, when the optical path of certain excitation light (referred to as reference excitation light) slightly deviates from the optical path of the counter excitation light with respect to that excitation light inside the optical medium 20 and the light is emitted from the side surfaces 20c to 20f, the incidence direction of the reference excitation light largely deviates from the emission direction of the counter excitation light. As a result, it is possible to prevent the counter excitation light from being incident to the excitation light source outputting the reference excitation light in the excitation light source unit 12.

The laser light L2 which is supplied from the laser light source unit is reflected by the mirror portion 14a and is incident from the side surface 20c into the optical medium 20 in a direction coaxial with the excitation light L1 from the excitation light source unit 12a. The laser light L2 which is seed light incident from the side surface 20c passes through the same optical path as that of the excitation light L1 so as to be emitted from the side surface 20d. The light which is emitted from the side surface 20d is reflected in order of the mirror portions 14b and 14c and is incident from the side surface 20e into the optical medium 20 again in a direction coaxial with the excitation light L1 from the excitation light source unit 12c. The laser light L2 which is incident from the side surface 20e into the optical medium 20 passes through the same optical path as that of the excitation light L1 from the excitation light source unit 12c so as to be emitted from the side surface 20f.

When the laser light L2 is incident to the laser gain medium 22 excited by the excitation light L1, the laser light L2 is amplified by the emission light according to a stimulated emission phenomenon. For that reason, since the laser light L2 is propagated through the optical medium 20 while being incident in order of the laser gain media 22a to 22f in a zigzag shape, the amplified laser light L2 is emitted from the side surface 20f. The laser light L2 emitted from the side surface 20f is reflected by the mirror portion 14d and is extracted as output light from the laser device 1A.

In this way, the laser gain medium 22 is irradiated with the excitation light L1 and the laser light L2 through the optical medium 20. Particularly, the laser gain medium 22 includes a first surface S1 and a second surface S2 intersecting (being orthogonal to) the thickness direction (the Y-axis direction) and a third surface S3 along the thickness direction. The thickness of the laser gain medium 22 which is defined as a distance between the first surface S1 and the second surface S2 is, for example, about 0.25 mm or more and 10 mm or less.

The first surface S1 is a surface bonded to the optical medium 20 and is an input/output surface of the excitation light L1 and the laser light L2. That is, the laser gain medium 22 generates the emission light by the irradiation of the excitation light L1 from the first surface S1. The second surface S2 is a surface opposite to the first surface S1. The reflection member 23 is provided on the second surface S2. Here, the reflection member 23 covers the entirety of the second surface S2.

The reflection member 23 is, for example, a high-reflection coating (for example, a reflection film) having high reflectivity with respect to at least two wavelengths of the excitation light L1 and the laser light L2. As an example, the wavelength of the excitation light L1 is 808 nm and the wavelength of the laser light L2 is 1064 nm. Accordingly, as described above, the excitation light L1 and the laser light L2 are reflected by the reflection member 23 in the second surface S2. The third surface S3 is a surface which is located at the outer edge portion of the laser gain medium 22 so as to connect the first surface S1 and the second surface S2, that is, a side end surface.

Here, the laser gain medium 22 includes the irradiation area IR which is irradiated with the excitation light L1 and an outer area OR which is located on the outside of the irradiation area IR when viewed from the thickness direction. Here, the laser gain medium 22 consists of the irradiation area IR and the annular outer area OR which surrounds the irradiation area IR. Here, since the excitation light L1 is obliquely incident to the laser gain medium 22 (the first surface S1) (that is, so as to be inclined with respect to the normal line of the first surface S1), the irradiation area IR of the excitation light L1 has an oval shape as illustrated in FIG. 4(*a*). FIG. 4(*b*) is an example of an intensity distribution of the excitation light L1 in the irradiation area IR.

Additionally, the irradiation area IR is also an excitation area which is excited by the irradiation of the excitation light L1 in the laser gain medium 22. Further, the irradiation area IR is also a heating area which is heated by the irradiation of the excitation light L1. Meanwhile, the outer area OR is also a non-excitation area and a non-heating area.

As described above, the laser light source unit, the excitation light source unit 12, and the mirror portion 14 constitute an input optical system for inputting the excitation light L1 and the laser light L2 to be amplified from the first surface S1 to the laser gain medium 22. More specifically, here, the input optical system including the laser light source unit, the excitation light source unit 12, and the mirror portion 14 inputs the laser light L2 and the excitation light L1 from the first surface S1 to the laser gain medium 22 through the optical medium 20 by the coaxial optical path.

FIGS. 1 to 4 will be referred continuously. The cooling member 17 cools each laser gain medium 22. The cooling member 17 includes a contact portion 17*a* which contacts the laser gain medium 22 through the reflection member 23 and a cooling unit 17*b* which is connected to the contact portion 17*a*. The contact portion 17*a* provides a heat transfer path between the laser gain medium 22 and the cooling unit 17*b*. The contact portion 17*a* is, for example, a heat pipe.

The contact portion 17*a* is provided in each laser gain medium 22. The cooling unit 17*b* can store, for example, a liquefied gas (for example, liquid nitrogen) as a heat medium (refrigerant). Further, the cooling unit 17*b* is, for example, a cooling device such as a refrigerator. Additionally, FIG. 1 illustrates an example in which six contact portions 17*a* are distributed to two cooling units 17*b*, but the contact portions may be integrated in one cooling unit 17*b*.

The contact portion 17*a* is thermally connected to the second surface S2 of the laser gain medium 22 through the reflection member 23 so that a cooling area CA of the laser gain medium 22 is formed on the second surface S2. The cooling area CA is an area in which the cooling member 17 contacts the second surface S2 through the reflection member 23. Here, the cooling area CA corresponds to an end surface on the side of the second surface S2 of the contact portion 17*a*. The outer edge of the cooling area CA is located within the irradiation area IR when viewed form the thickness direction (the Y-axis direction) of the laser gain medium 22.

A case in which the outer edge of the cooling area CA is located within the irradiation area IR includes a case in which the outer edge of the cooling area CA matches the outer edge of the irradiation area IR and a case in which the outer edge of the cooling area CA is located on the inside (the center side of the irradiation area IR) in relation to the outer edge of the irradiation area IR, when viewed from the thickness direction of the laser gain medium 22. Here, as an example, the outer edge of the cooling area CA is located on the inside of the outer edge of the irradiation area IR when viewed from the thickness direction of the laser gain medium 22. For this reason, the cooling member 17 cools the laser gain medium 22 by exchanging heat with the laser gain medium 22 in a range narrower than the irradiation area IR on the second surface S2.

In other words, in the second surface S2 of the laser gain medium 22, an annular non-cooling area TA is formed on the outside of the cooling area CA. The non-cooling area TA of the second surface S2 is exposed to, for example, an atmosphere in a container. Accordingly, in the non-cooling area TA, the laser gain medium 22 is substantially insulated without any heat exchange with the other members.

Meanwhile, the heating member 18 is for heating the laser gain medium 22. The heating member 18 is provided in each laser gain medium 22. More specifically, the heating member 18 is provided on a surface other than the first surface S1 at the outer edge portion in the extension direction of the laser gain medium 22 and heats the laser gain medium 22 by inputting heat to the outer area OR of the laser gain medium 22. Here, the heating member 18 is formed in an annular shape and is provided on the third surface S3 of the laser gain medium 22. The heating member 18 is, for example, a ring heater. Additionally, the heating member 18 may be formed on, for example, the second surface S2 at the outer edge portion of the laser gain medium 22 by printing, adhering, or attaching.

Next, operations and effects of the laser device 1A and the laser medium unit 10A will be described. First, the knowledge obtained by the inventor will be described. FIG. 5 is a diagram showing a result obtained by calculating the phase shift amount of the laser gain medium. FIGS. 5(*a*) and 5(*c*) are diagrams showing a temperature distribution within a cross-section taken along the thickness direction of the laser gain medium. In the drawings below, in the case of showing the temperature distribution, the temperature becomes higher as the light gray changes to the dark gray. Further, FIGS. 5(*b*) and 5(*d*) are graphs showing a relationship between the phase shift amount and the radial position of the laser gain medium. The phase shift amount is a value obtained when the laser light is input and output in a direction parallel to the thickness direction of the laser gain medium (in a direction perpendicular to the incident surface).

Additionally, in the following calculation, the laser gain medium is formed in a disk shape for convenience of description. For this reason, since the laser gain medium is symmetric with respect to the center line of the radial direction, a range of a half in the radial direction is shown below. Here, the thickness of the laser gain medium is set to 0.25 mm and the radius is set to 10 mm. Further, here, the irradiation area (the excitation area) of the excitation light in the laser gain medium is formed in a disk shape having a radius of 5 mm and concentric with the laser gain medium. That is, here, the irradiation area is set to a range of 50% of the radial position from the center of the laser gain medium in the radial direction.

As comparison targets, FIGS. 5(a) and 5(b) show a case in which the entirety of the second surface of the laser gain medium (the surface opposite to the incident surface of the excitation light) is set as the cooling area (hereinafter, also referred to as cooling of 100%). FIGS. 5(c) and 5(d) show a case in which a range of 50% of the radial position from the center of the second surface in the radial direction is set as the cooling area (hereinafter, also referred to as cooling of 50%). That is, in FIGS. 5(c) and 5(d), the outer edge of the cooling area matches the outer edge of the irradiation area.

When these two cases are compared with each other, the temperature of the outer area outside the irradiation area increases in the case of the cooling of 50% as compared with the case of the cooling of 100%. However, it is understood that the phase shift amount of the outer area is uniform in the radial direction and a difference with the phase shift amount in the irradiation area decreases. That is, when the thickness of the laser gain medium is uniform, it is understood that an influence (a thermal lensing effect) on the incident light due to a difference in phase shift amount occurring in a boundary area between the irradiation area (the excitation area) and the outer area (the non-excitation area) can be reduced in the case of the cooling of 50% as compared with the cooling of 100%.

FIG. 6(a) is a graph showing a calculation result of a relationship between the laser gain medium and the thermal lensing effect. In the graph of FIG. 6(a), a vertical axis indicates a value (that is, a normalized thermal lensing effect) when a non-plane wave component due to the thermal lensing effect in the case of the cooling of 100% of the laser gain medium having a thickness of 1 mm is a reference value (=1). As shown in FIG. 6(a), according to the cooling of 50%, it is understood that the thermal lensing effect can be reduced to about $\frac{1}{50}$ of the reference value even when the thickness of the laser gain medium is thickened to 5 mm.

FIG. 6(b) is a graph showing a calculation result of a change of the phase shift amount depending on the heating of the laser gain medium by the heating member. In FIG. 6(b), a dashed line indicates a heating case and a solid line indicates a non-heating case. Additionally, here, heat is input from the third surface (the side end surface) of the laser gain medium. According to FIG. 6(b), in a case where heating exists, it is understood that since a heating the irradiation area by incidence of the excitation light and an influence of heat inputting to the outer area from the third surface are added, a difference of phase shift (that is, the thermal lensing effect) is reduced as the whole.

Figure 7:
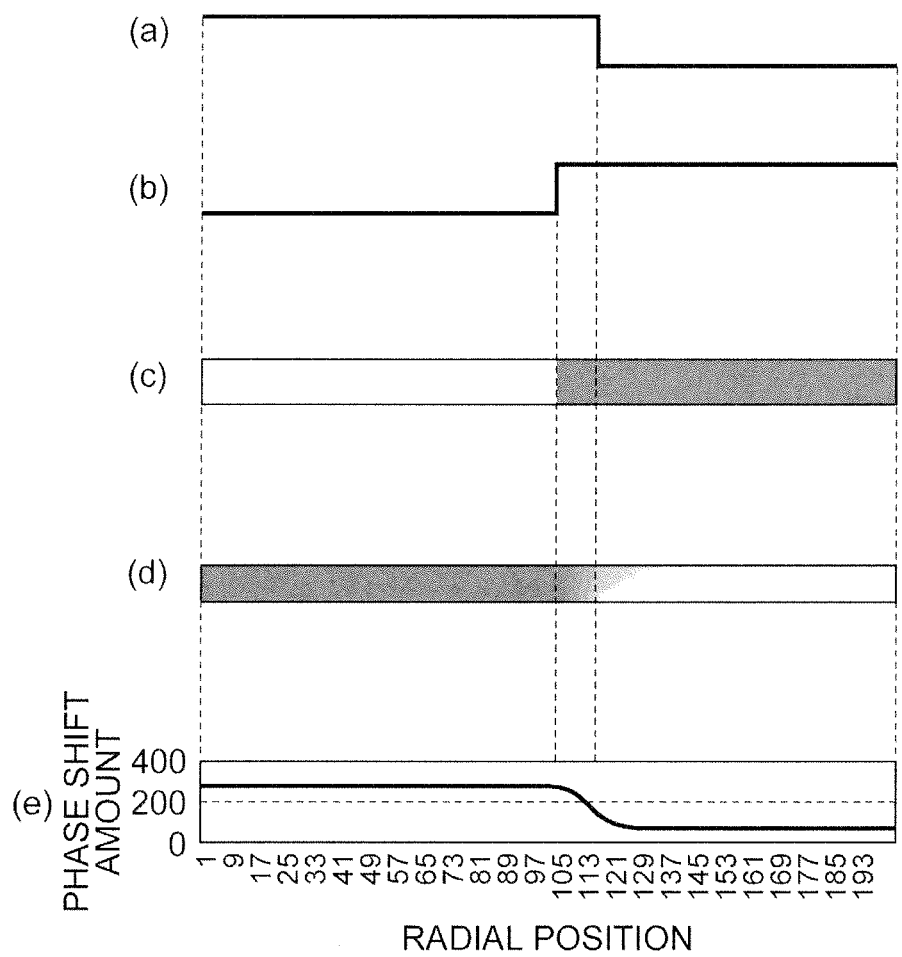
FIG. 7 is a diagram showing a calculation result in a case in which an outer edge of a cooling area is located on the inside in relation to an irradiation area.

FIG. 7 is a diagram showing a calculation result when the outer edge of the cooling area is located on the inside in relation to the irradiation area. That is, FIG. 7 shows a case in which the laser gain medium is cooled from a range narrower than the irradiation area in the second surface. Here, the thickness of the laser gain medium is set to 0.25 mm. Further, here, the irradiation area is set to a range of 50% of the radial position and the cooling area is set to 43% of the radial position so that a difference is formed between the irradiation area and the cooling area.

FIG. 7(a) shows a range of the cooling area in the radial direction, FIG. 7(b) shows a range of the irradiation area of the excitation light in the radial direction, and FIG. 7(c) shows a range of the irradiation area in the radial direction within a cross-section taken along the thickness direction. Further, FIG. 7(d) shows a temperature distribution within a cross-section taken along the thickness direction and FIG. 7(e) shows a phase shift amount with respect to the radial position.

According to FIG. 7, since an outer area (that is, a range from 43% to 50% of the radial position) of the cooling area in the irradiation area is not directly cooled by a heat flow in the thickness direction even when the area is heated by the excitation light, a temperature distribution of a mismatched portion between excitation and cooling has a shape in which the heat flow in the thickness direction and the heat flow in the radial direction are mixed. As a result, the temperature of the outer area (the non-heating area) becomes higher than that of the irradiation area (the heating area) and the phase shift amount of the outer area becomes larger than the phase shift amount of the irradiation area.

From this result, a thermal barrier which is generated by the mismatch between heating and cooling can increase the temperature of the outer area or the thermally induced phase shift to be larger than those of the irradiation area. Also in that case, it is understood that the distribution of the phase shift is uniform. Thus, it is considered that a difference in phase shift amount in a boundary between the irradiation area and the outer area can be reduced as much as possible by controlling the phase of the outer area using this principle.

FIG. 8(a) is a graph showing a calculation result for optimizing the cooling area. In FIG. 8(a), the thickness of the laser gain medium is set to 2 mm and the irradiation area is set to a range of 50% of the radial position. Further, a case (cooling of 47%) in which the cooling area is set to a range of 47% of the radial position is indicated by a solid line, a case (cooling of 46%) in which the cooling area is set to a range of 46% of the radial position is indicated by a dashed line, and a case (cooling of 45%) in which the cooling area is set to a range of 45% of the radial position is indicated by a one-dotted chain line.

As shown in FIG. 8(a), in the cooling of 47%, the phase shift amount of the outer area becomes smaller than the phase shift amount of the irradiation area. In contrast, in the cooling of 45%, the phase shift amount of the outer area becomes larger than the phase shift amount of the irradiation area. Then, in the cooling of 46%, the phase shift amount of the outer area becomes substantially the same as the phase shift amount of the irradiation area. Thus, in this case, it is understood that the cooling of 46% allows the optimization of the thermal barrier generation by reducing the thermal lensing effect.

Similarly, FIGS. 8(b) and 8(c) show a result for optimizing the cooling area in a state in which the thickness of the laser gain medium is 0.5 mm. FIG. 8(b) shows a temperature distribution within a cross-section taken along the thickness direction and FIG. 8(c) shows a phase shift amount with respect to a radial position. In this way, when the cooling area is optimized in a range (here, a range within 50%) within the irradiation area, the thermal lensing effect becomes $\frac{1}{20000}$ (normalized thermal lensing effect=$4.7 \times 10^{-5}$) and hence the phase shift amount can be substantially flat. Additionally, the cooling area is set to a range of 49% of the radial position.

Figure 9:
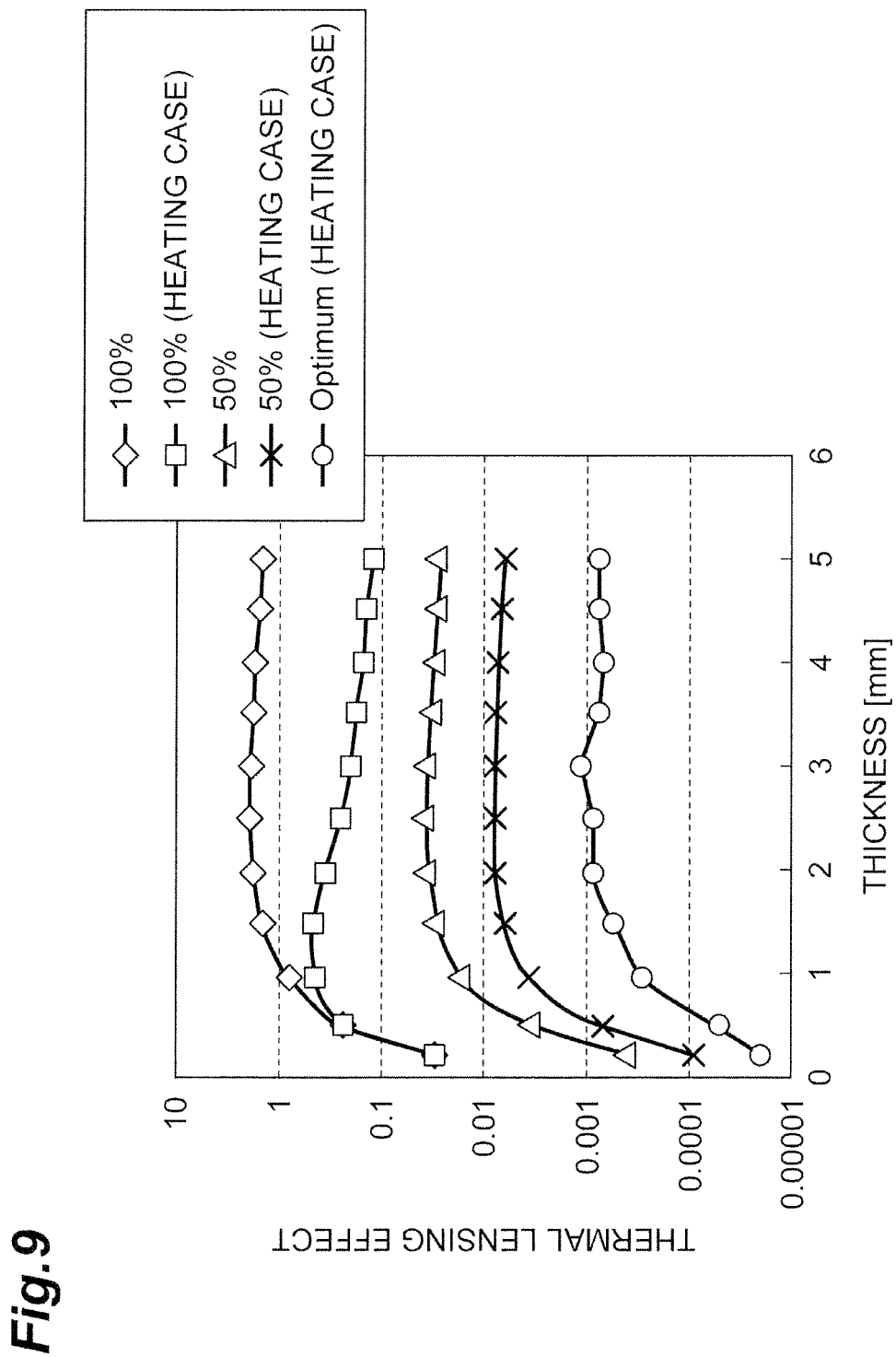
FIG. 9 is a graph summarizing the calculation results of FIGS. 5 to 8.

FIG. 9 is a graph of summarizing the calculation results of FIGS. 5 to 8. A vertical axis indicates a normalized thermal lensing effect. As shown in FIG. 9, the thermal lensing effect can be reduced most when the cooling area is optimized in a range within the irradiation area (here, a range within 50%) and heating is performed from the outer area. In this case, it is possible to reduce the thermal lensing effect to $\frac{1}{1000}$ or less in a wide range in which the thickness of the laser gain medium is 0.25 mm to 5 mm.

On the basis of the above-described knowledge of the inventor, an effect of the laser medium unit 10A according to the embodiment will be described. In the laser medium unit 10A, the plate-shaped laser gain medium 22 includes the first surface S1 which is an incident surface of the excitation light L1 and the second surface S2 which is a surface opposite to the first surface S1 and is provided with the cooling area CA of the cooling member 17. Further, the laser gain medium 22 includes the irradiation area IR which is irradiated with the excitation light L1 and the outer area OR which is located on the outside of the irradiation area IR when viewed from the thickness direction.

Then, the outer edge of the cooling area CA is located within the irradiation area IR of the excitation light L1 when viewed from the thickness direction. That is, in this laser medium unit 10A, the cooling area CA becomes a range equal to or smaller than the irradiation area IR of the excitation light L1 when viewed from the thickness direction of the laser gain medium 22. Thus, according to this laser medium unit 10A, it is possible to reduce the thermal lensing effect and to improve the beam quality.

Further, the laser medium unit 10A further includes the heating member 18 for heating the laser gain medium 22. Then, the heating member 18 is provided on a surface other than the first surface S1 in the outer edge portion of the laser gain medium 22 and heats the laser gain medium 22 by inputting heat to the outer area OR. By using such a heating member 18, it is possible to further reduce the thermal lensing effect without disturbing the incidence of the excitation light L1 in the first surface S1.

Further, in the laser medium unit 10A, the laser gain medium 22 includes the third surface S3 which is located on the side of the outer edge portion and connects the first surface S1 and the second surface S2 along the thickness direction. Then, the heating member 18 may be provided on the third surface S3. In this way, the heating member can be provided on the third surface S3 corresponding to the side end surface of the laser gain medium 22.

Further, the laser device 1A includes the laser medium unit 10A and an input optical system for inputting the excitation light L1 and the laser light L2 to be amplified from the first surface S1 to the laser gain medium 22. Thus, according to this laser device 1A, it is possible to reduce the thermal lensing effect of the laser gain medium 22 and to improve the beam quality.

Second Embodiment

Figure 10:
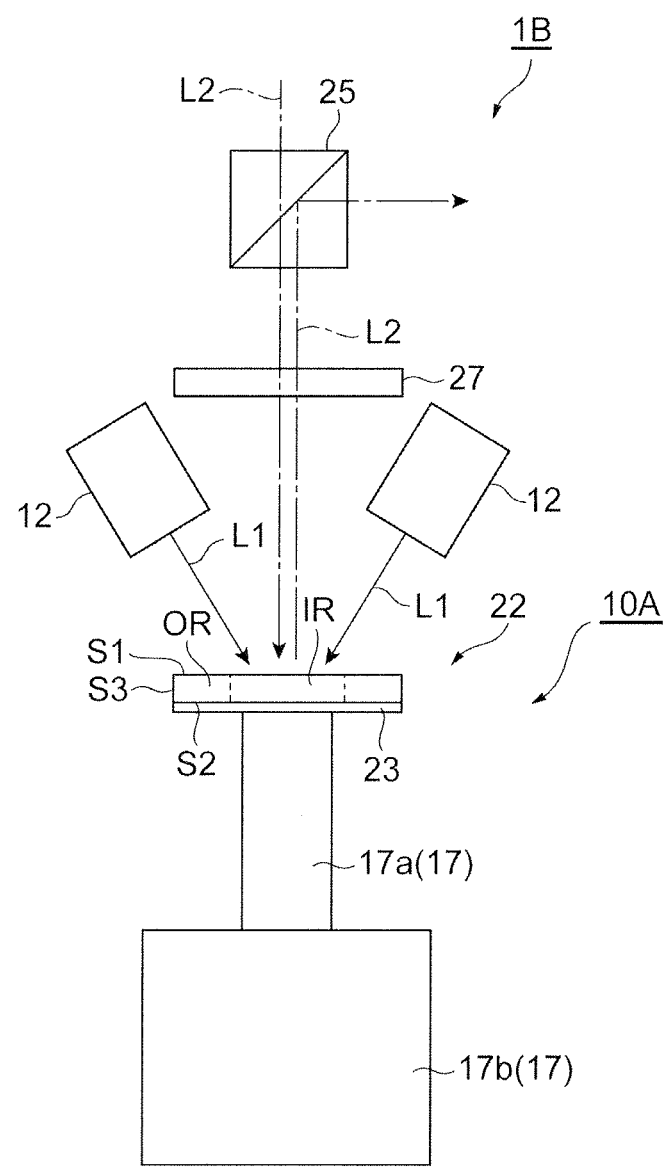
FIG. 10 is a diagram illustrating an outline of a laser device according to a second embodiment.

Next, a laser device according to a second embodiment will be described. FIG. 10 is a diagram schematically illustrating the laser device according to the second embodiment. As illustrated in FIG. 10, a laser device 1B includes the laser medium unit 10A, the pair of excitation light source units 12, a polarizing beam splitter 25, and a polarizing rotating element 27. The polarizing rotating element 27 is, for example, a λ/4 wavelength plate. Here, the laser medium unit 10A includes a single laser gain medium 22, along with the cooling member 17, the heating member 18, and the reflection member 23 corresponding thereto. Further, the laser medium unit 10A does not include the optical medium 20.

Here, the laser light L2 which is seed light to be amplified is emitted from a laser light source unit (not illustrated), is transmitted through the polarizing beam splitter 25 and the polarizing rotating element 27 in a linear polarized state, and is incident from the first surface S1 to the laser gain medium 22. Here, the laser light L2 is incident to the laser gain medium 22 in the thickness direction of the laser gain medium 22, that is, in a direction perpendicular to the first surface S1. Meanwhile, the excitation light L1 is incident from the first surface S1 to the laser gain medium 22 through the optical path inclined with respect to the normal line of the first surface S1 by the pair of excitation light source units 12.

Thus, the laser light source unit, the polarizing beam splitter 25, the polarizing rotating element 27, and the excitation light source unit 12 constitute an input optical system which inputs the excitation light L1 and the laser light L2 to be amplified from the first surface S1 to the laser gain medium 22. More specifically, here, the input optical system inputs the laser light L2 and the excitation light L1 from the first surface S1 to the laser gain medium 22 through different optical paths.

The laser light L2 which is incident to the laser gain medium 22 is amplified inside the laser gain medium 22 and is reflected by the reflection member 23 in the second surface S2. The laser light L2 reflected in the second surface S2 is further amplified inside the laser gain medium 22 and is emitted from the laser gain medium 22 in the first surface S1. The laser light L2 emitted from the laser gain medium 22 is transmitted through the polarizing rotating element 27 so that the polarizing direction thereof rotates by 90°. The laser light L2 transmitted through the polarizing rotating element 27 is reflected in a direction different from the incident light in the polarizing beam splitter 25 and is output to the outside.

Also in the laser device 1B and the laser medium unit 10A with the above-described configuration, it is possible to reduce the thermal lensing effect and to improve the beam quality due to the same reason as described above.

Third Embodiment

Figure 11:
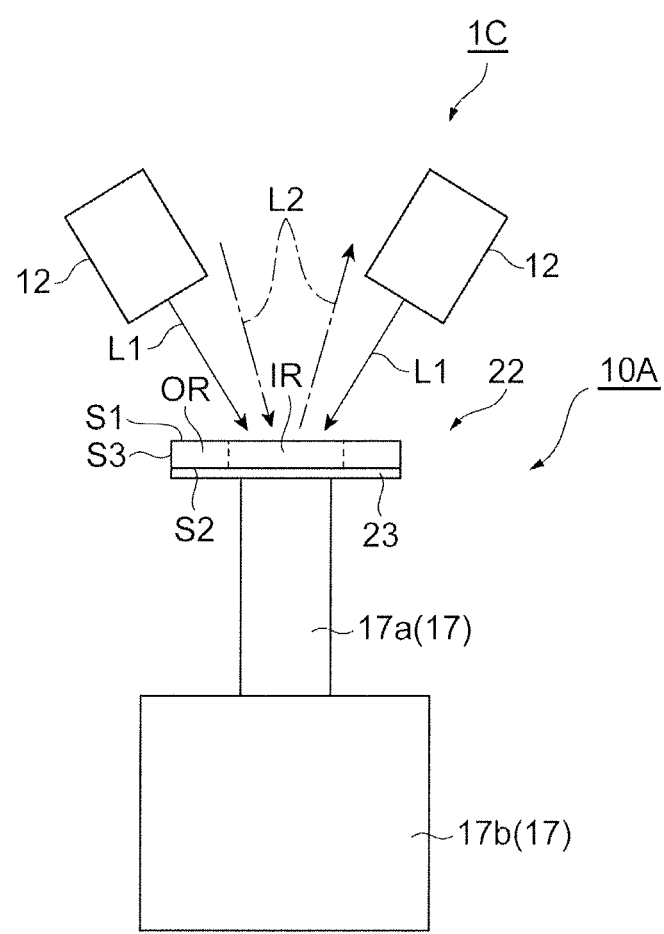
FIG. 11 is a diagram illustrating an outline of a laser device according to a third embodiment.

Next, a laser device according to a third embodiment will be described. FIG. 11 is a diagram schematically illustrating the laser device according to the third embodiment. As illustrated in FIG. 11, a laser device 1C includes the laser medium unit 10A similar to that of the second embodiment and the pair of excitation light source units 12.

Here, the laser light L2 which is seed light to be amplified is emitted from a laser light source unit (not illustrated) and is incident from the first surface S1 to the laser gain medium 22. Here, the laser light L2 is incident to the laser gain medium 22 by the optical path inclined with respect to the normal line of the first surface S1 by a predetermined angle. Thus, here, the laser light L2 corresponding to the incident light and the laser light L2 corresponding to the emission light are spatially divided. Meanwhile, the excitation light L1 is incident from the first surface S1 to the laser gain medium 22 through the optical path inclined by a different predetermined angle with respect to the normal line of the first surface S1 by the pair of excitation light source units 12.

Thus, the laser light source unit and the excitation light source unit 12 constitute an input optical system which inputs the excitation light L1 and the laser light L2 to be amplified from the first surface S1 to the laser gain medium 22. More specifically, here, the input optical system inputs the laser light L2 and the excitation light L1 from the first surface S1 to the laser gain medium 22 by different optical paths.

Also in the laser device 1C and the laser medium unit 10A with the above-described configuration, it is possible to reduce the thermal lensing effect and to improve the beam quality due to the same reason as described above.

Fourth Embodiment

Figure 12:
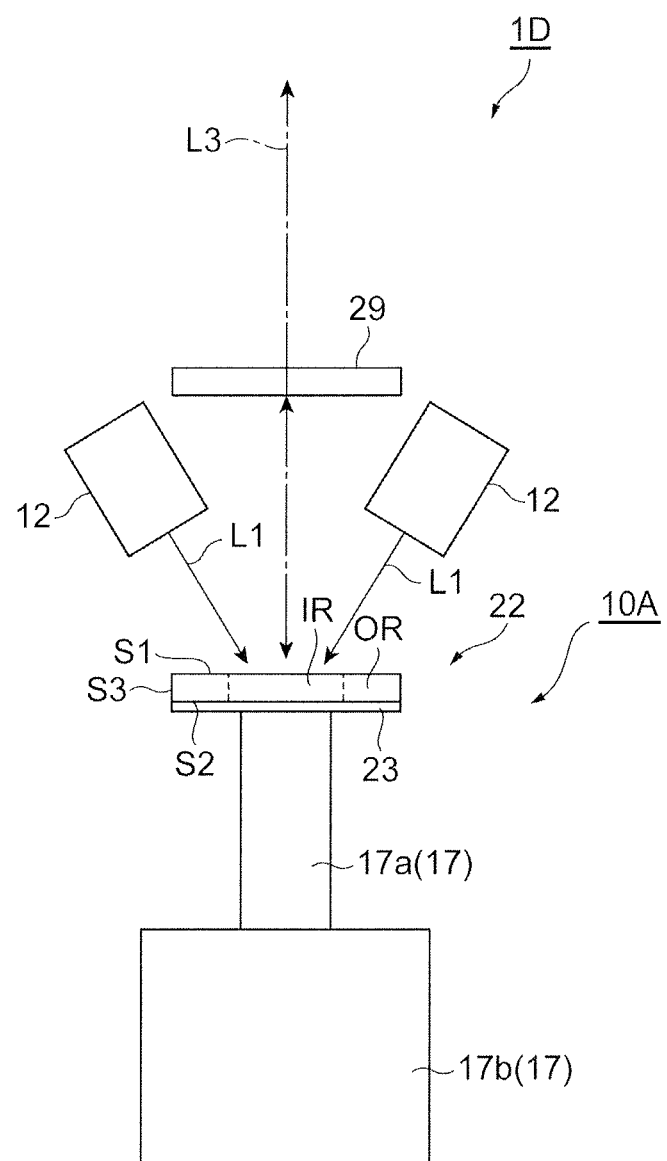
FIG. 12 is a diagram illustrating an outline of a laser device according to a fourth embodiment.

Next, a laser device according to a fourth embodiment will be described. FIG. 12 is a diagram schematically illustrating the laser device according to the fourth embodiment. As illustrated in FIG. 12, a laser device 1D includes the laser medium unit 10A similar to that of the second embodiment, the pair of excitation light source units 12, and a resonator mirror 29. The resonator mirror 29 constitutes a laser resonator between the resonator mirror 29 and the reflection member 23 on the second surface S2 of the laser gain medium 22.

The laser device (the laser oscillator) 1D generates laser light L3 by supplying the excitation light L1 to the laser gain medium 22 of the laser medium unit 10A.

The resonator mirror 29 partially reflects the laser light L3. The resonator mirror 29 constitutes an optical resonator along with the reflection member 23. In other words, the resonator mirror 29 and the reflection member 23 are disposed so that the laser light L3 is repeatedly reflected between the resonator mirror 29 and the reflection member 23 and the laser gain medium 22 is disposed within the resonant light path of the laser light L3 between the resonator mirror 29 and the reflection member 23.

In the above-described configuration, the excitation light L1 output from the excitation light source unit 12 excites the laser gain medium 22 similarly to the case of the laser device (the laser amplifier) 1B. The laser light L3 which is the emission light from the excited laser gain medium 22 is reflected between the resonator mirror 29 and the reflection member 23 and is optically amplified. The laser light L3 partially transmitted through the resonator mirror 29 is light output from the laser oscillator.

Also in the laser device 1D and the laser medium unit 10A with the above-described configuration, it is possible to reduce the thermal lensing effect and to improve the beam quality due to the same reason as described above.

The above-described embodiment has been used to describe an embodiment of the laser medium unit and the laser device according to an aspect of the invention. Thus, the laser medium unit and the laser device according to an aspect of the invention are not limited to the laser medium unit 10A and the laser devices 1A to 1D described above. The laser medium unit and the laser device according to an aspect of the invention can be obtained by arbitrarily modifying the laser medium unit 10A and the laser devices 1A to 1D without changing the spirit of claims.

For example, the laser devices 1A to 1D according to the embodiments are not limited to the configurations illustrated in the drawings and may be configured as different laser devices by replacing or adding partial components. Further, the laser device may be appropriately modified in accordance with the wavelengths of the excitation light L1 and the laser lights L2 and L3 or the materials of the optical medium 20 and the laser gain medium 22.

For example, the materials of the optical medium 20 and the laser gain medium 22 are not limited to YAG and the active element added to the laser gain medium 22 is not limited to Nd. The optical material and the active element used in a solid laser device such as a laser amplifier or a laser oscillator may be used. As another example of the material of the optical medium 20 and the laser gain medium 22, (GGG: Gadolinium Gallium Garnet ($Gd_3Ga_5O_{12}$)) can be exemplified.

Further, as another example of the active element, Yb can be exemplified. Further, the laser gain medium 22 is not limited to a rectangular plate shape and may be a disk shape or other plate shapes.

Further, in the above-described embodiment, a case in which the contact portion 17a such as a heat pipe is connected to the cooling unit 17b such as a refrigerator has been exemplified as the cooling member 17. However, the cooling member 17 is not limited thereto and may be, for example, another one such as a Peltier element provided in each of the laser gain media 22.

INDUSTRIAL APPLICABILITY

A laser medium unit and a laser device capable of improving beam quality can be provided.

REFERENCE SIGNS LIST 1A to 1D: laser device, 10A: laser medium unit, 12: excitation light source unit, 16: laser medium, 17: cooling member, 18: heating member, 20: optical medium, 22: laser gain medium, 23: reflection member, 25: polarizing beam splitter, 27: polarizing rotating element, 29: resonator mirror, S1: first surface, S2: second surface, S3: third surface, L1: excitation light, L2: laser light, L3: laser light, IR: irradiation area, OR: outer area, CA: cooling area, TA: non-cooling area.

The invention claimed is:

1. A laser medium unit comprising:
a plate-shaped laser gain medium which includes a first surface and a second surface opposite to the first surface and generates emission light by irradiation of excitation light from the first surface;
a reflection member that is provided on the second surface so as to reflect the excitation light and the emission light; and
a cooling member that cools the laser gain medium,
wherein the laser gain medium includes an irradiation area which is irradiated with the excitation light and an outer area which is located outside the irradiation area when viewed from a thickness direction intersecting the first surface and the second surface,
wherein the cooling member is thermally connected to the second surface through the reflection member so that a cooling area of the laser gain medium is formed on the second surface, and
wherein an outer edge of the cooling area is located inside the irradiation area when viewed from the thickness direction.

2. The laser medium unit according to claim 1, further comprising:
a heating member that heats the laser gain medium,
wherein the heating member is provided on a surface other than the first surface in an outer edge portion of the laser gain medium and heats the laser gain medium by inputting heat to the outer area.

3. The laser medium unit according to claim 2,
wherein the laser gain medium includes a third surface which is located on a side of the outer edge portion and connects the first surface and the second surface in the thickness direction, and
wherein the heating member is provided on the third surface.

4. A laser device comprising:
the laser medium unit according to claim 1; and
an input optical system which inputs the excitation light and laser light to be amplified from the first surface to the laser gain medium.

5. The laser device according to claim 4, further comprising:
an optical medium to which an active element is not added and through which the excitation light and the laser light are transmittable,
wherein the laser gain medium is provided on the optical medium so that the first surface is bonded to the optical medium, and
wherein the input optical system inputs the laser light and the excitation light from the first surface to the laser gain medium through the optical medium by a coaxial optical path.

* * * * *